United States Patent
Van Keilegom et al.

(10) Patent No.: US 6,406,198 B1
(45) Date of Patent: Jun. 18, 2002

(54) RELOCKABLE FILM CARTRIDGE SYSTEM FOR A PHOTOGRAPHIC SYSTEM

(75) Inventors: Roland Van Keilegom, Mortsel; Dirk Peeters, Boom; Jozef Mostmans, Beerse, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/551,391

(22) Filed: Apr. 18, 2000

Related U.S. Application Data

(60) Provisional application No. 60/133,406, filed on May 10, 1999.

(30) Foreign Application Priority Data

Apr. 20, 1999 (EP) ............................. 992 02 216

(51) Int. Cl.$^7$ ............................... G03B 17/26
(52) U.S. Cl. ........................ 396/518; 396/528
(58) Field of Search ................... 396/517, 518, 396/519, 520, 527, 528

(56) References Cited

U.S. PATENT DOCUMENTS

| | | | |
|---|---|---|---|
| 3,751,253 A | * 8/1973 | Cohn | 396/517 |
| 3,971,470 A | 7/1976 | White | |
| 4,953,193 A | * 8/1990 | Robinson | 378/162 |
| 4,961,000 A | 10/1990 | Finkenzeller et al. | |
| 5,473,400 A | 12/1995 | Lemberger et al. | |
| 5,712,486 A | * 1/1998 | Soltani et al. | 250/484.4 |
| 5,823,330 A | * 10/1998 | Werner et al. | 206/232 |

FOREIGN PATENT DOCUMENTS

FR  2 623 166 A1  5/1989

* cited by examiner

Primary Examiner—David M. Gray
(74) Attorney, Agent, or Firm—Breiner & Breiner, L.L.C.

(57) ABSTRACT

A relockable cartridge system for photosensitive media, including: a media-receiving tray having a media access opening; a cartridge holder for holding the media-receiving tray; a cover for covering the media access opening; wherein the cover has a first seal portion and the cartridge holder has a second seal portion for co-operating with the first seal portion so as to form a relockable seal between at least portions of the cover and the cartridge holder.

12 Claims, 5 Drawing Sheets

RELOCKABLE FILM CARTRIDGE SYSTEM FOR A PHOTOGRAPHIC SYSTEM

This application claim benefit to provisional application 60/133,406 filed May 10, 1999.

FIELD OF THE INVENTION

The present invention relates to packaging for photographic film. More specifically the invention is related to a relockable cartridge system for medical imaging film.

BACKGROUND OF THE INVENTION

X-ray and other types of medical imaging photographic film are typically packaged in optically opaque (i.e. light tight) and photo-inert containers such as cassettes, magazines, cartridges and bags. The film must be removed from these packages and loaded into the X-ray machine, camera or other imaging device under darkroom conditions, an inconvenient procedure.

U.S. Pat. No. 1,098,844 discloses a film package which can be loaded directly into a camera, thereby alleviating the need for a darkroom. However, this package is relatively inefficient in design and requires manual manipulation to bring the film into exposure position. The package is therefore incompatible with the automatic film handling mechanism of modern imaging systems.

U.S. Pat. No. 4,727,391 discloses a package for sheet film and a loading device for the package. The package includes a tray and a flexible cover peelably attached to the tray by an adhesive. After the package is loaded into a loading device of an image recorder, the cover is peeled off, enabling a delivery equipment to access the film. The adhesive layer has an edge portion inclined to the longitudinal direction of the tray so that the cover can be peeled off easily. Packages of the type shown in this patent contain many sheets of one specific type of film. However, depending on the nature of the image being exposed, it is often necessary to load different sizes and/or types of film into the imaging device. Any unexposed film remaining within a cartridge is therefore wasted if the cartridge must be removed from the imaging device so a new cartridge bearing a different type or size of film can be inserted.

Patent application PCT/EP88/00166 discloses an automatic film-loading device for sheet film cassettes. After a cassette is inserted into an unloading and reloading station in the device, the cassette is opened and the exposed sheet of film is seized, removed and transported to a developing apparatus. The cassette is then reloaded with a sheet of film from one of a plurality of supply magazines, each containing different sizes of film. The freshly loaded cartridge is then dispensed from the device for subsequent use. Although this automatic film-loading device reduces the waste associated with the removal of unused film from an imaging device, it is a complicated and relatively expensive accessory for the imaging device.

Patent application WO 92/15043 discloses a resealable cartridge for photosensitive media, including (a) a photo-inert and optically opaque media-receiving tray having a media access opening; (b) a flexible, photo-inert and optically opaque cover for the media access opening; and (c) a photo-inert and optically opaque seal between the tray and the cover, the seal including an openable and resealable adhesive seal between at least portions of the cover and the tray.

It is evident that there is a continuing need for improved film handling systems for photographic imaging devices. In particular, there is a need for a device that conveniently enables different sizes and/or types of film to be inserted into and removed from a medical imaging device without resulting waste. The device must be relatively inexpensive to be commercially viable.

OBJECTS OF THE INVENTION

It is an object of the present invention to provide a relockable cartridge system for photosensitive material, that permits the use of different sizes and/or kinds of photographic film in a photographic device such as an imaging device, in a convenient way and without waste.

Further objects of the present invention will be clear from the description hereafter.

SUMMARY OF THE INVENTION

The above-mentioned objects are realised by a relockable cartridge system (11) for photosensitive media that includes: (a) a media-receiving tray (20) having a media access opening, (b) a cartridge holder (13) for holding the media-receiving tray (20), (c) a cover (22) for covering the media access opening; wherein the cover (22) has a first seal portion (24) and the cartridge holder (13) has a second seal portion (56) for co-operating with the first seal portion (24) so as to form a relockable seal (24,56) between at least portions of the cover and the cartridge holder.

Specific features for preferred embodiments of the invention are set out in the dependent claims.

BRIEF DESCRIPTION OF THE DRAWINGS

The invention will be described by the following illustrative embodiments with reference to the accompanying drawings without the intention to limit the invention thereto, and in which.

DETAILED DESCRIPTION OF THE INVENTION

Figure 1:
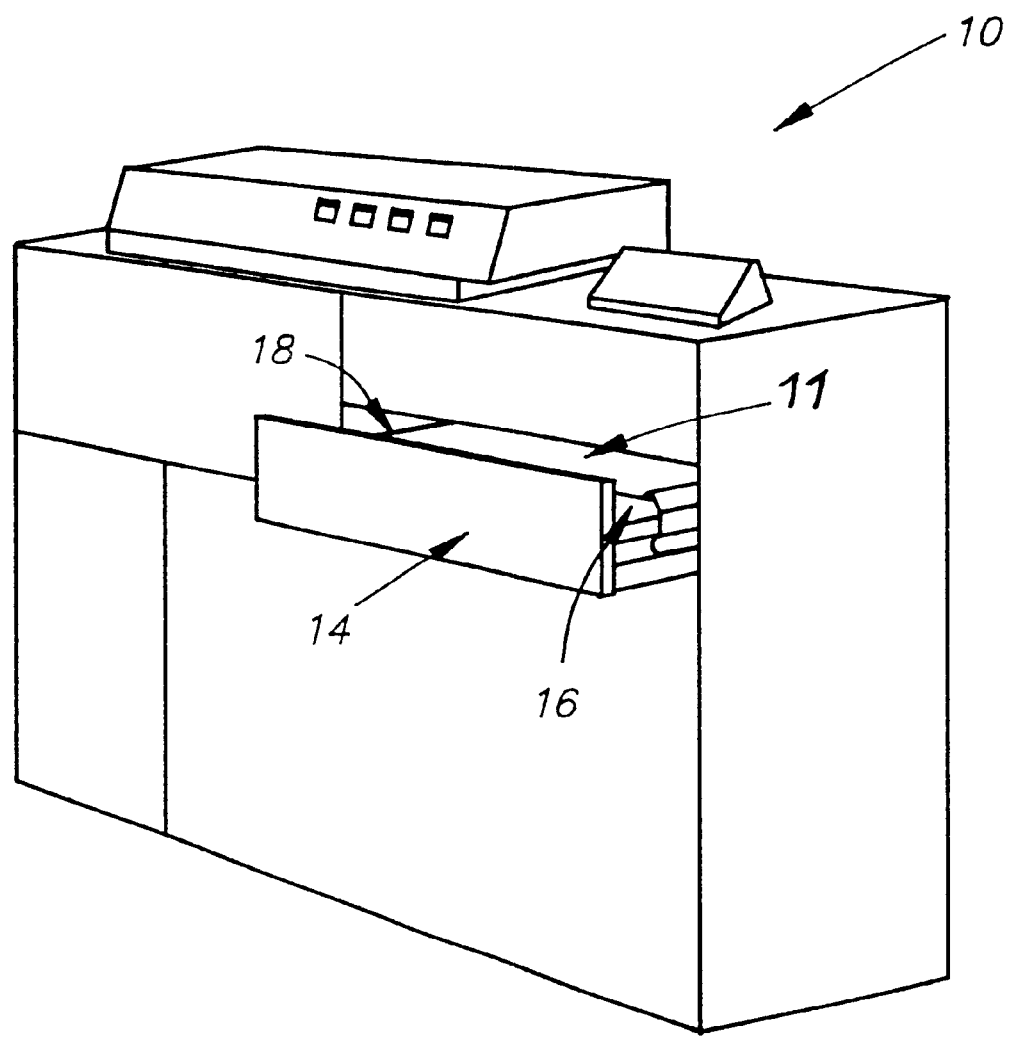
FIG. 1 shows a photographic system 10 configured for use with a relockable film cartridge system 11 of the present invention.
Figure 5:
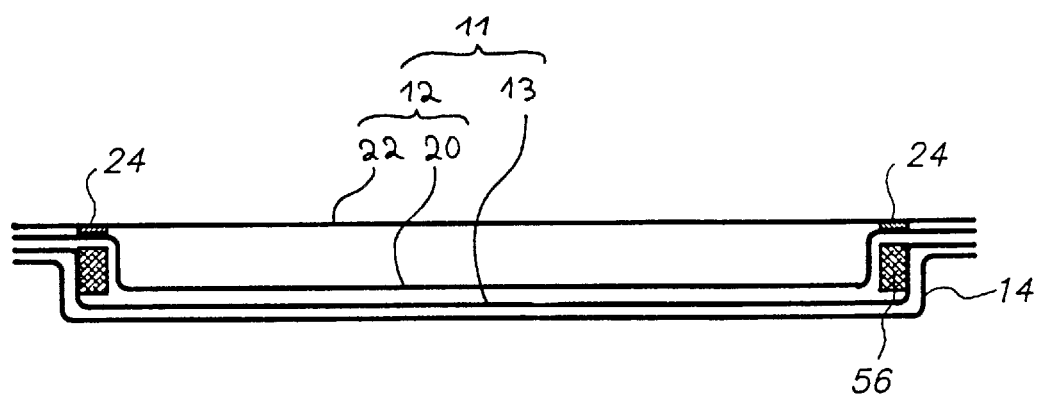
FIG. 5 is a side view of an embodiment of a cartridge system 11 according to the invention, that includes a cartridge holder 13 and a cartridge 12 that comprises a tray 20 and a cover 22.
Figure 6:
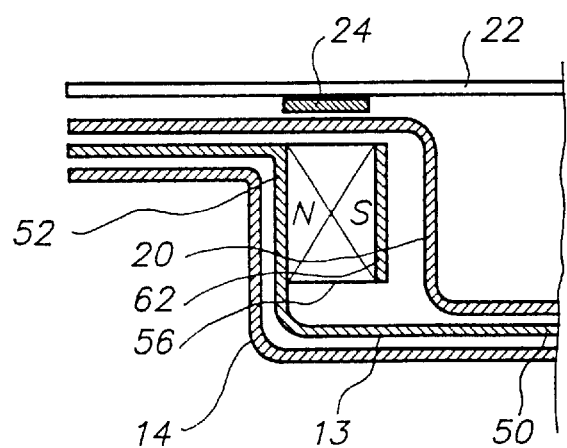
FIG. 6 is a detailed side view of the magnetic seal of the embodiment shown in FIG. 5.

FIG. 1 is an illustration of a photographic device 10 that is configured to operate with a relockable photographic film cartridge system in accordance with the present invention. In the embodiment shown, photographic device 10 includes a drawer 14 which is opened to provide access to a cartridge-receiving base 16 into which film cartridge system 11 is loaded. As shown in FIG. 5, cartridge system 11 includes a cartridge holder 13 and a cartridge 12. A cartridge opening/closing mechanism 18 is also mounted to drawer 14. After a film cartridge system 11 has been loaded into base 16, drawer 14 is closed to lock the cartridge within a light-tight compartment. Opening/closing mechanism 18 then opens cartridge 12 to permit access to sheets of film (not visible in FIG. 1) in the cartridge. Sheets of film are removed from the opened cartridge 12 and imaged by other subsystems (not shown) of photographic device 10. The imaged film is temporarily stored in a magazine (not shown) before being removed from photographic device 10 for subsequent processing. Alternatively, the imaged film can be automatically fed to a docked or attached film developer (not shown) for processing.

Opening/closing mechanism 18 is also actuated to close the relockable seal of cartridge system 11 before the cartridge system is removed from photographic device 10. Thus, cartridge system 11 can be removed from photographic device 10 before all the film within the cartridge has been exposed. Cartridge systems 11 for different sizes or types of film media can therefore be conveniently loaded into and removed from photographic device 10 as needed, without wasting any unused film remaining in the cartridge.

Relockable cartridge system 11 can be described in greater detail with reference to FIGS. 2 to 7. As shown in FIG. 5, cartridge system 11 includes a cartridge holder 13 and a cartridge 12 that comprises a tray 20 and a cover 22. In the embodiment shown in FIGS. 5 and 6, cover 22 is relockably attached to tray 20 by magnets 56 provided in cartridge holder 13 and magnetisable strips 24 provided on cover 22. The magnets 56 and the strips 24 together form a magnetic seal between at least portions of the cartridge holder 13 and the cover 22. Because of the magnetic seal, cartridge 12 may be opened, closed, opened again, etc.; i.e. cartridge system 11 is openable and relockable.

Figure 2:
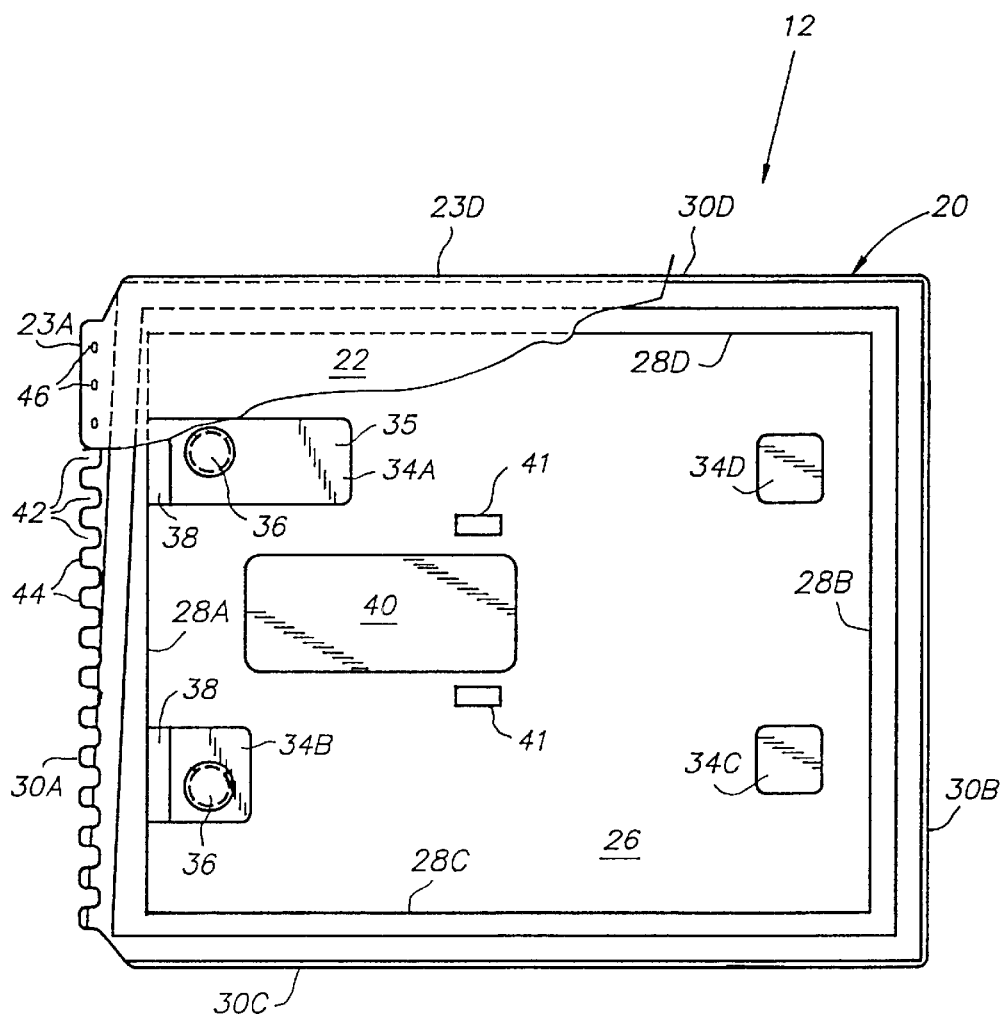
FIG. 2 is a top view of an embodiment of a film cartridge 12 including a cover 22, with a portion of the cover broken away.
Figure 3:
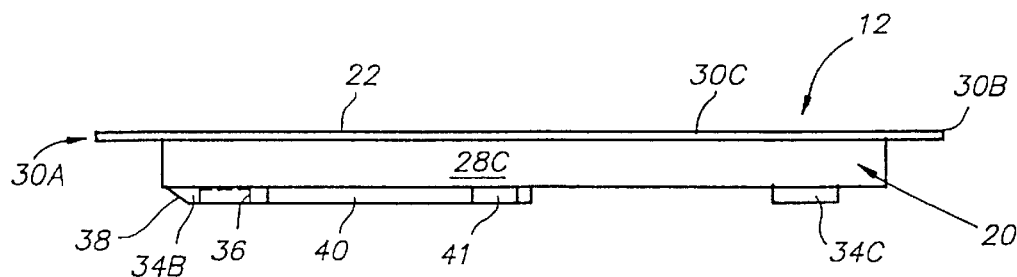
FIG. 3 is a side view of the cartridge and cover shown in FIG. 2.

Cartridge 12 and cover 22 are shown in greater detail in FIGS. 2 and 3. Preferably, cover 22 is flexible. Preferably, both film-receiving tray 20 and cover 22 are made from photo-inert and optically opaque materials. Tray 20 is a relatively shallow member and includes a generally planar bottom wall 26, front wall 28A, rear wall 28B and side walls 28C and 28D. Front wall 28A is the wall at the front side of cartridge 12, which is the side facing opening/closing mechanism 18 in drawer 14. Rear wall 28B is opposite front wall 28A. Rear wall 28B is connected to front wall 28A by side walls 28C and 28D. Lips 30A–30D may extend outwardly from the upper edges of respective walls 28A–28D, thus circumscribing a film access opening of tray 20. Inwardly projecting guides (not shown) may be formed on walls 28A–28D to properly position sheets of film (not shown) within tray 20. Feet 34A–34D are formed into and extend downwardly from bottom wall 26 to support cartridge 12 within base 16 of photographic device 10. Bottom wall 26 also includes positioning recesses 36, which can be tapered. Positioning recesses 36 are configured to receive positioning lugs (FIG. 3) extending from base 16. The positioning lugs secure and properly orient cartridge 12 within photographic device 10. In the embodiment shown, position recesses 36 are moulded into feet 34A and 34B adjacent to front wall 28A. A media presence monitoring well 35 is also formed in bottom wall 26. Media presence monitoring sensors of photographic device 10 (not shown) extend into well 35 below the surface of bottom wall 26 when all film has been removed from tray 20.

Feet 34A and 34B (i.e. those adjacent to front wall 28A) also include ramp surfaces 38 which slope downwardly from the lower edge of the front wall to the bottom of the feet. Ramp surfaces 38 guide feet 34A and 34B over the position lugs in photographic device base 16 as cartridge 12 is being loaded into the base. The embodiment of tray 20 illustrated in FIGS. 2 and 3 also includes a recess 40 in bottom wall 26 which forms a platform on the bottom exterior of tray 20. The platform formed by recess 40 is configured to receive an information bearing medium such as a bar code which includes recorded information pertaining to the characteristics of film within cartridge 12. A pair of feet 41 are formed as recesses in bottom wall 26 adjacent recess 40 to insure proper positioning of the information bearing medium with respect to a reading device (not shown) of photographic device 10. Reinforcing ribs (not shown in FIGS. 2 and 3) can also be moulded into bottom wall 26 and/or side walls 28A–28D to increase the rigidity of tray 20.

The forwardmost or leading edge of front lip 30A also includes a series of evenly spaced cut-out sections 42. Cut-out sections 42 form a series of spaced projections 44 on the leading edge of lip 30A. Cut-out sections 42 and projections 44 co-operate with yet to be described aspects of cover 22 and opening/closing mechanism 18 to facilitate the opening and subsequent closing of cartridge 12.

Cover 22 is a flexible, photo-inert, optically opaque sheet sized to extend over the access opening of tray 20. Cover 22 has edges 23A–23D (only edges 23A and 23D are shown in FIG. 2) which may extend between and mate with tray lips 30A–30D, respectively. In one embodiment, cover 22 is a foil laminate formed by polyethylene-bonded layers of 25 $\mu$m thick polyethylene, 8.75 $\mu$m thick aluminium foil and 50 $\mu$m thick polypropylene. This foil laminate cover 22 is of a sufficiently stretchy nature to prevent the cover from popping off tray 20 when cartridge 12 is flexed, yet rigid enough to prevent detrimental amounts of stretch related buckling if the cover is opened by opening/closing mechanism 18 by rolling the cover up. The foil laminate cover 22 also provides for the integrity of a vacuum within cartridge 12.

A paper or polyester reinforcing strip (not separately shown) can be added to the leading or front edge 23A of cover 22 to increase cover rigidity above projections 44 and facilitate the operation of opening/closing mechanism 18. In one embodiment, the reinforcing strip is a 6 mm wide, 150 $\mu$m thick, strip of mylar. The front edge 23A of cover 22 extends over the tray cut-out sections 42, and includes elongated apertures 46, which are positioned over the cut-out sections when the cover is sealed onto tray 20. Apertures 46 facilitate the engagement of opening/closing mechanism 18 with cover 22. Patent application WO 92/15043 describes an embodiment of an opening/closing mechanism 18 that can be used with a tray according to the invention.

An advantage of a cartridge system in accordance with the invention is that a seal portion, comprising e.g. magnets 56, is included in cartridge holder 13. As a consequence, tray 20 that holds the photosensitive media may be relatively inexpensive, since it does not have to contain both the first seal portion (e.g. magnets 56) and the second seal portion (e.g. magnetisable strips 24) that together form the relockable seal. The user only has to purchase a small set of cartridge holders 13, e.g. one or two cartridge holders for each size of film. Cartridges 12 are used as "refill": each time all the film sheets in a cartridge are completely used up, the cartridge system 11 is removed from the photographic device and the empty cartridge 12 in the cartridge holder 13 is replaced by another, full cartridge 12, after which the cartridge system 11 is placed again in the photographic device 10. If the film sheets in a cartridge 12 are only partially used up, but another size or type of film has to be used in photographic device 10, the cartridge system 11 is replaced by another cartridge system 11 holding a cartridge 12 with the other size or type of film. A cartridge according to the invention may be cheaper in the first place because it does not have to contain both the first and the second seal portions that together form the relockable seal, as discussed above, and in the second place because its construction may be simpler. One cause of a simpler construction is that cut-out sections 42 and projections 44 (see FIG. 2) may be absent from cartridge 12 and may only be present in cartridge holder 13. Another cause of a simpler construction of cartridge 12 is that a cartridge needs less mechanical stiffness (e.g. a smaller wall thickness or a less rigid material may be used for the tray, no reinforcing ribs are required, etc.); this is explained now. During manipulations such as placing the cartridge 12 into the photographic device 10, the cartridge may not be deformed too much or otherwise the relockable seal may open and the photographic media in the cartridge may be exposed to light, to environmental conditions or to both. Therefore, if no cartridge holder is used, but the cartridge is directly placed into and removed from photographic device 10, the cartridge has to have a relatively high mechanical stiffness. Thus, using a cartridge holder 13 that is preferably stiff and contains a seal portion for forming a seal allows the use of inexpensive cartridges 12; altogether, this method of working is more cost-effective than using cartridges without a cartridge holder.

Tray 20 is preferably moulded in one piece from a relatively inexpensive and photo-inert polyolefin material so that it is economically feasible to dispose of the cartridge following a single use. In one embodiment tray 20 is moulded from 555-ABS material, which is commercially available from the Dow Chemical Company. Polystyrene materials having appropriate characteristics may also be used. Tray 20 may also be made from cheaper materials such as cardboard. In case of a cardboard tray, preferably a coating, as known in the art, is applied to the cardboard in order to avoid the formation of dust.

Cover 22 is the cover that includes a first seal portion of the relockable seal. A second seal portion, co-operating with the first seal portion, is included in cartridge holder 13. Together, both seal portions form the relockable seal.

Figure 4:
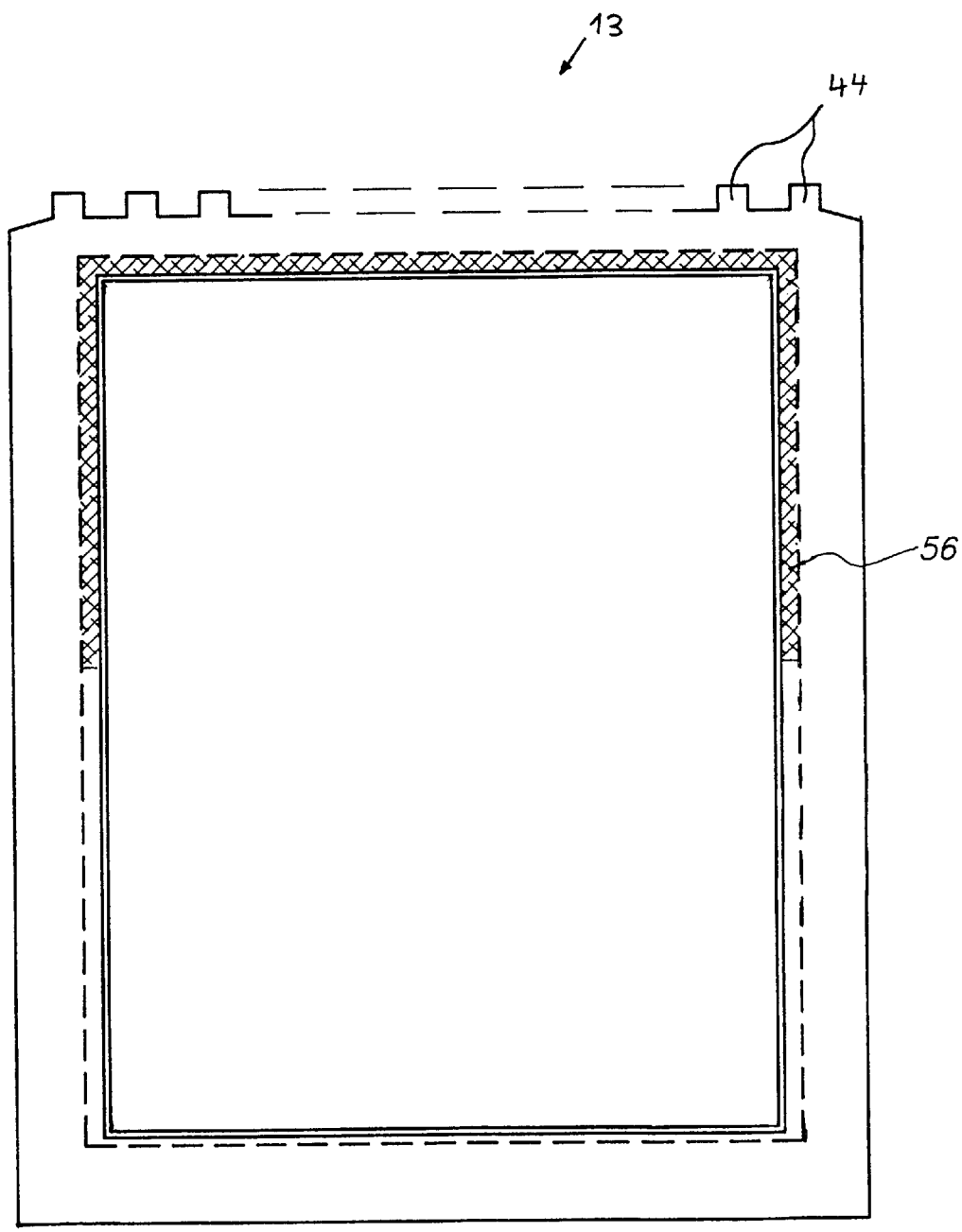
FIG. 4 is a top view of an embodiment of a cartridge holder 13 in accordance with the present invention.

In a first embodiment shown in FIGS. 2 to 4, tray 20 and cover 22 are both part of cartridge 12 that holds the photosensitive media. Cover 22 may be attached to tray 20 in a way as known in the art such as by welding or by gluing; cover 22 may also be attached relockably to tray 20 in a way as disclosed in this document. Preferably, cover 22 is attached to tray 20 at the rear side of tray 20, i.e. at the side of rear wall 28B (see FIG. 2). Optionally, cover 22 is welded to tray 20, or sealed to it in another, non-relockable manner. Preferably, this weld or seal protects the packaged photographic media from light and from environmental influences during storage and transport. When the tray is first opened, this weld or seal is broken.

In a second embodiment in accordance with the invention, cover 22 that includes a first seal portion of the relockable seal is not attached as in the first embodiment to tray 20 but to cartridge holder 13. Again, cover 22 is preferably attached to the rear side, in this second embodiment of the cartridge holder. Cover 22 includes a seal portion for forming a seal between cover 22 and cartridge holder 13. In addition to cover 22, a second cover may be provided for covering the media access opening of tray 20. Preferably, this second cover is attached to tray 20 so that cartridge 12, in this second embodiment, includes tray 20 and the second cover but not cover 22. The second cover may but does not have to include another seal portion for forming a relockable seal. In case opening/closing mechanism 18 opens cover 22 by rolling it up, cover 22 and the second cover may be rolled up together. Optionally, this second cover is welded to tray 20, or sealed to it in another, non-relockable manner. Preferably, this weld or seal protects the packaged photographic media from light and from environmental influences during storage and transport. When the tray is first opened, this weld or seal is broken.

Figure 7:
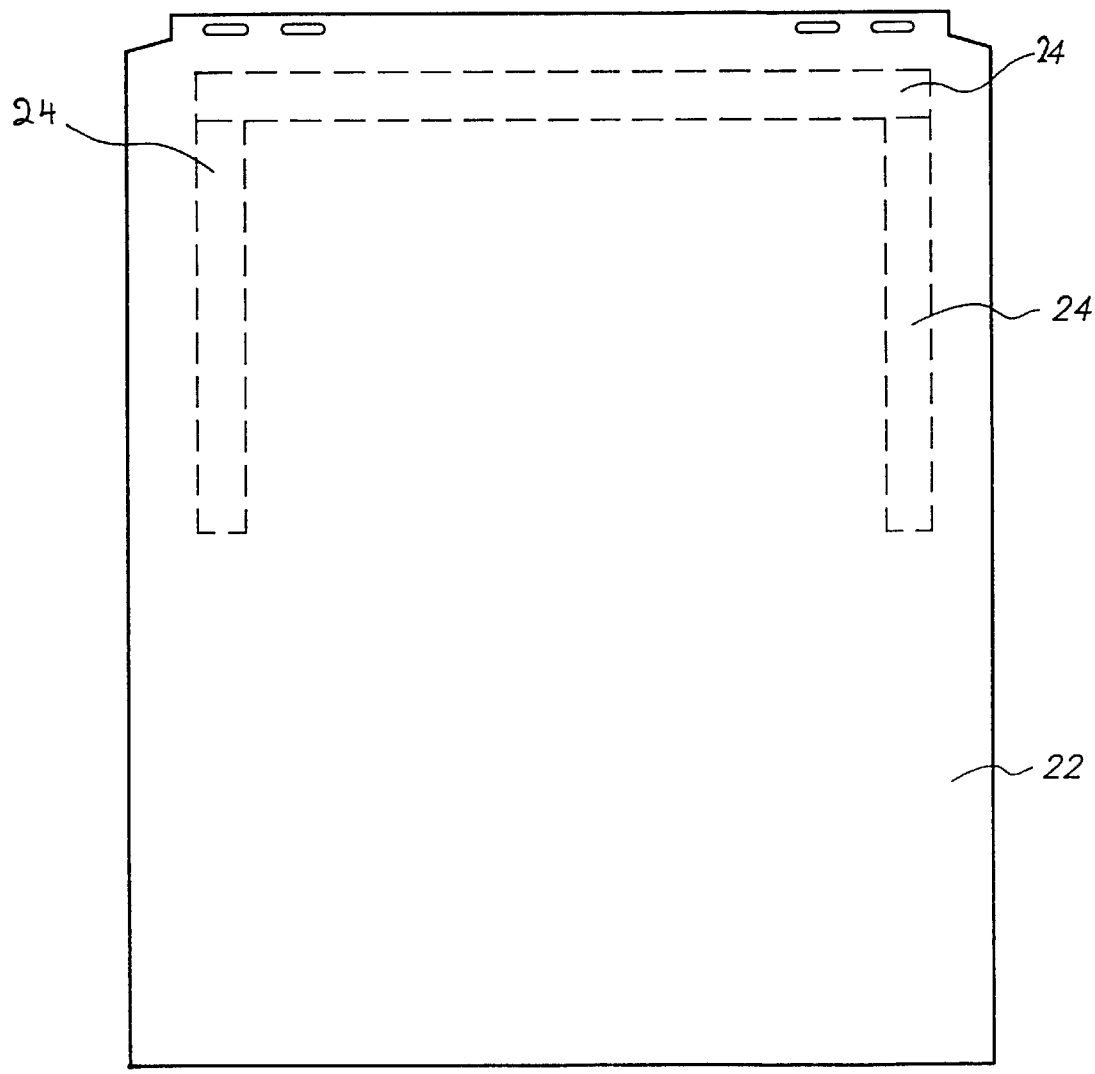
FIG. 7 is a top view of an embodiment of a cover 22.

An embodiment of a magnetic seal in accordance with the invention is shown in FIGS. 4 to 7. As shown in FIG. 5, cartridge is holder 13 includes a first seal portion for forming a seal, i.e. magnets 56. Cover 22 includes a second seal portion, strips 24, that co-operate with the first seal portion 56 and thus form a relockable seal between cartridge holder 13 and cover 22. FIG. 4 is a top view of a cartridge holder 13 showing magnets 56 located at the front wall of the cartridge holder, i.e. the wall adjacent the projections 44, and at portions of the side walls. FIG. 7 shows a cover 22 with strips 24 co-operating with the magnets 56. Cover 22 may contain magnetisable iron powder, or may comprise magnetisable metallic strips 24, or both. The metallic strips 24 preferably have a thickness between 10 $\mu$m and 500 $\mu$m, more preferably between 25 $\mu$m and 100 $\mu$m.

Preferably, the magnets 56 are permanent magnets that include a magnetic material such as ALNICO, samarium-cobalt or samarium-cobalt-neodymium. In a preferred embodiment (see FIG. 6) the cartridge holder 13 has a base 50 and upstanding walls 52, and the magnets 56 are mutually aligned so that the same type of pole of the magnets, i.e. either the north pole N or the south pole S, always faces one or more upstanding walls 52. The magnets 56 are preferably fixed to the walls 52 of the cartridge holder by means of metallic plates 62, such as magnetisable steel plates. The cartridge holder may be made of metal, such as magnetisable steel.

The invention is not limited to the embodiments described above. Preferably, tray 20 and cover 22 are optically opaque and photo-inert, but this is not absolutely required. In a preferred embodiment, cover 22 is flexible so that it can be rolled up by opening/closing mechanism 18, but the flexibility is not really required either—another type of opening/closing mechanism, as known in the art, may be foreseen. FIGS. 4 and 7 show a magnetic seal located at the front wall of the cartridge holder and at portions of the side walls. In another embodiment of the invention, the relockable seal is only located at the front wall. In yet another embodiment, the relockable seal is located at portions of the cover and of the cartridge holder.

The relockable seal between the cartridge holder 13 and the cover 22 may be a magnetic seal; it may be an adhesive seal as described in patent application WO 92/15043; it may be a hooks and loops seal as described in the European patent application entitled "Relockable film cartridge for photographic film", filed in the name of Agfa-Gevaert N. V. with reference number GN00011; it may be another relockable seal as known in the art; it may be a combination of two or more of the types of seal mentioned above.

Having described in detail preferred embodiments of the current invention, it will now be apparent to those skilled in the art that numerous modifications can be made therein without departing from the scope of the invention as defined in the appending claims.

What is claimed is:

1. A relockable cartridge system for photosensitive media, comprising:

a media-receiving tray having a media access opening;

a cover for covering said media access opening and having a first seal portion;

a cartridge holder for holding said media-receiving tray, said cartridge holder having a second seal portion for co-operating with said first seal portion so as to form a relockable seal between at least portions of said cover and said cartridge holder.

2. The relockable cartridge system according to claim 1, wherein said relockable seal comprises an adhesive seal.

3. The relockable cartridge system according to claim 1, wherein said relockable seal comprises a magnetic seal.

4. The relockable cartridge system according to claim 1, wherein said relockable seal comprises a hooks and loops seal.

5. The relockable cartridge system according to claim 1 wherein said cover is flexible.

6. The relockable cartridge system according to claim 1 wherein said cover is attached to said media-receiving tray, said cover and said media-receiving tray forming a cartridge.

7. The relockable cartridge system according to claim 1 wherein said cover is attached to said cartridge holder.

8. The relockable cartridge system according to claim 1, wherein said cartridge holder has a front and wherein said second seal portion is located adjacent said front.

9. The relockable cartridge system according to claim 3, wherein said second seal portion comprises at least one magnet that includes ALNICO, samarium-cobalt or samarium-cobalt-neodymium.

10. The relockable cartridge system according to claim 9, wherein said cartridge holder has upstanding walls and wherein said second seal portion comprises a plurality of magnets, mutually aligned so that the same type of pole of the magnets faces the upstanding walls.

11. The relockable cartridge system according to claim 3, wherein said first seal portion comprises a magnetisable metallic strip.

12. The relockable cartridge according to claim 1 wherein said media-receiving tray and said cover are photo-inert and optically opaque.

* * * * *

UNITED STATES PATENT AND TRADEMARK OFFICE
CERTIFICATE OF CORRECTION

PATENT NO. : 6,406,198 B1
DATED : June 18, 2002
INVENTOR(S) : Roland Van Keilegom et al.

It is certified that error appears in the above-identified patent and that said Letters Patent is hereby corrected as shown below:

<u>Title page,</u>
Item [30], Foreign Application Priority Data, "992 02 216" should read
-- 99201216 --.

Signed and Sealed this

Fourth Day of February, 2003

JAMES E. ROGAN
*Director of the United States Patent and Trademark Office*